US 7,356,172 B2

(12) United States Patent
Fan et al.

(10) Patent No.: US 7,356,172 B2
(45) Date of Patent: Apr. 8, 2008

(54) METHODS AND SYSTEMS FOR MOTION TRACKING

(75) Inventors: Liexiang Fan, Issaquah, WA (US); Patrick L. Von Behren, Bellevue, WA (US); Arun P. Tirumalai, Issaquah, WA (US); Zuhua Mao, Issaquah, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 140 days.

(21) Appl. No.: 10/259,350

(22) Filed: Sep. 26, 2002

(65) Prior Publication Data
US 2004/0064036 A1  Apr. 1, 2004

(51) Int. Cl.
G06K 9/00 (2006.01)
G06K 9/36 (2006.01)
A61B 5/00 (2006.01)

(52) U.S. Cl. ............... 382/128; 382/107; 382/131; 382/132; 600/407

(58) Field of Classification Search ......... 600/407, 600/414, 508, 416; 382/128, 131, 103, 107, 382/133, 132; 345/418, 419; 250/203.3, 250/559.32
See application file for complete search history.

(56) References Cited

U.S. PATENT DOCUMENTS

| 5,503,153 | A | | 4/1996 | Liu et al. ............... 128/661.08 |
|---|---|---|---|---|
| 5,538,003 | A | | 7/1996 | Gadonniex et al. ..... 128/660.09 |
| 5,558,091 | A | * | 9/1996 | Acker et al. ............... 600/424 |
| 5,575,286 | A | * | 11/1996 | Weng et al. ............... 600/444 |
| 5,582,173 | A | | 12/1996 | Li ........................... 128/660.07 |
| 5,594,807 | A | | 1/1997 | Liu ........................... 382/128 |
| 5,646,691 | A | * | 7/1997 | Yokoyama ................ 348/416.1 |
| 5,671,739 | A | | 9/1997 | Darrow et al. ............ 128/653.1 |
| 5,680,862 | A | * | 10/1997 | Song et al. ................. 600/410 |
| 5,873,830 | A | | 2/1999 | Hossack et al. ............. 600/447 |
| 5,876,342 | A | | 3/1999 | Chen et al. .................. 600/443 |
| 5,899,861 | A | | 5/1999 | Friemel et al. .............. 600/443 |
| 6,009,212 | A | | 12/1999 | Miller et al. ................. 382/294 |
| 6,012,458 | A | | 1/2000 | Mo et al. .................... 128/916 |
| 6,083,168 | A | | 7/2000 | Hossack et al. ............. 600/443 |
| 6,095,976 | A | * | 8/2000 | Nachtomy et al. .......... 600/443 |
| 6,159,152 | A | | 12/2000 | Sumanaweera et al. ..... 600/443 |
| 6,193,660 | B1 | | 2/2001 | Jackson et al. ............. 600/433 |
| 6,195,445 | B1 | * | 2/2001 | Dubuisson-Jolly et al. . 382/107 |

(Continued)

OTHER PUBLICATIONS

Yeung, Fai; Levinson, Stephen F.; Feature Adaptive Motion Tracking of Ultrasound Image Sequences Using a Deformable Mesh, Dec. 1998, IEEE Transactions on Medical Imaging, vol. 17, No. 6, pp. 945-956.

Primary Examiner—Eric Winakur
Assistant Examiner—Helene Bor

(57) ABSTRACT

Systems and methods are described for tracking motion in a medical imaging system. The methods use landmark sets including hard landmarks and soft landmarks. The systems can include means for generating a landmark set, means for constructing a landmark set spatial relationship, means for computing a context similarity measurement, means for cost function construction, and means for cost function minimization and motion estimation. The invention provides advantages because, among other reasons, the use of a cost function of two or more variables, where the cost function is defined over members of the landmark set collection, and the cost function subject to at least two constraints and the landmark set stability in terms of context similarity measurements and spatial relationship provide effective and robust motion tracking.

28 Claims, 4 Drawing Sheets

U.S. PATENT DOCUMENTS

| | | |
|---|---|---|
| 6,236,738 B1 | 5/2001 | Zhu et al. ............... 382/107 |
| 6,277,074 B1 | 8/2001 | Chaturvedi et al. ......... 600/437 |
| 6,289,135 B1 * | 9/2001 | Declerck et al. ........... 382/276 |
| 6,295,464 B1 * | 9/2001 | Metaxas ................... 600/407 |
| 6,364,835 B1 * | 4/2002 | Hossack et al. ............ 600/443 |
| 6,447,453 B1 | 9/2002 | Roundhill et al. .......... 600/443 |
| 6,447,454 B1 | 9/2002 | Chenal et al. ............. 600/449 |
| 6,549,803 B1 * | 4/2003 | Raghavan et al. .......... 600/431 |
| 6,934,407 B2 * | 8/2005 | Allouche .................. 382/128 |
| 2002/0120195 A1 * | 8/2002 | Hossack et al. ........... 600/443 |
| 2003/0013964 A1 * | 1/2003 | Bjaerum et al. ........... 600/443 |
| 2003/0160786 A1 * | 8/2003 | Johnson .................. 345/419 |

* cited by examiner

METHODS AND SYSTEMS FOR MOTION TRACKING

FIELD OF THE INVENTION

The invention relates generally to the field of medical imaging systems. More particularly, the invention relates to tracking of a region of interest implemented in a medical imaging system.

BACKGROUND OF THE INVENTION

Prior art motion tracking is known to those skilled in the art. For ultrasound imaging, a common technique is speckle tracking. A region of interest can identify a particular anatomy in a medical image. As subsequent images are generated, the representation of the anatomy in the image may change. The anatomy may move or alter its physical appearance. Medical imaging of anatomy is rarely static due to patient, body, or imaging component motion, or physical changes in the anatomy imaged such as a change in the direction of flow or the injection of an image enhancement agent. To designate the same anatomy in a plurality of images, the user of an imaging system can manually adjust the position of the region of interest in each image during a review of the images. In some cases the region of interest identifying particular anatomy can be tracked in real time. However, tracking a region of interest containing anatomy whose imaging parameter or parameters change dramatically over the track duration is not provided in the prior art, and manual adjustment to maintain a region of interest surrounding a particular aspect of the anatomy can be very time consuming.

Some prior art tracking methods use a mesh as shown in FIG. 2. In FIG. 2, the left configuration is the regular mesh grid, and it is allowed to be deformed into the configuration as shown on the right when motion occurs. A mesh provides a partition of an image domain into polygonal elements, and is used to track the features of an image by minimizing a global cost function, e.g., sum of absolute differences (SAD), over the grid points of the mesh.

Tracking systems with no a priori knowledge of motion generally rely on finding a peak or trough of some measurement parameter, like the correlation coefficient or the RMS signal strength. Conventional speckle tracking finds the peak in the correlation function, or a minimum in the Sum-Absolute-Difference or Sum-Square-Difference to align sequential images in order to estimate the distance speckle has moved over a fixed time. An $\alpha$-$\beta$ tracker, LMS tracker, or Kalman filter tracker is typically used to maintain a track on a target when known laws of motion are involved. When no a priori physical laws are assumed, the best conventional track is typically assumed to follow the highest peak correlation of the tracked parameter. A problem with this technology has been that some targets have multiple parameters, which can be tracked some or all of the time, where said parameters can exhibit temporal variability. Relying on continuously tracking one or more of these parameters independently may therefore be unreliable. So, what is required is a solution that overcomes the reliability problems of the prior art techniques. Another problem with the prior art tracking methods has been that reacquisition of a lost track is expensive in time and computations and can frequently produce ambiguous results. Therefore, what is also required is a solution that retains a track even when a parameter is lost, i.e., an intelligent decision making mechanism needs to be employed in the tracking method.

SUMMARY OF THE INVENTION

The present invention is defined by the following claims, and nothing in this section should be taken as a limitation on those claims. By way of introduction, the preferred embodiments described below include a method for tracking motion in a medical imaging system. The method for motion tracking includes creating a collection of at least one landmark, and tracking motion using a cost function of two or more variables. The cost function is defined over members of the collection, and the cost function subject to at least two constraints.

Another aspect of the invention provides a method of describing a region of interest (ROI) in a medical image. The method of describing an ROI includes identifying a hard landmark, selecting a plurality of soft landmarks proximal to the hard landmark and associating a cost function between at least two of the soft landmarks and the hard landmark. A system implementing this method of describing an ROI is also provided.

Another aspect of the invention provides a system for tracking motion in an imaging system. The system includes a display for providing images, processing resources adapted to create a landmark set, processing resources adapted to track motion, and memory adapted to store data for use by the processing resources. The images include an indication of location of a hard landmark of an image. The processing resources adapted to track motion use a cost function of at least two variables for each of at least two landmarks. The at least two landmarks being elements of the landmark set.

Another aspect of the invention provides a system for tracking motion in an imaging system. The system includes: means for generating a landmark set; means for computing a context similarity measurement; means for constructing a spatial relationship for a landmark set; means for construction of a cost function; and means for minimizing the cost function and estimating motion.

These, and other, aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore non-limiting, embodiments. The embodiments are illustrated in the drawings accompanying and forming a part of this specification, wherein like reference characters (if they occur in more than one view) designate the same parts. It should be noted that the features illustrated in the drawings are not necessarily drawn to scale.

DESCRIPTION OF PREFERRED EMBODIMENTS

The invention and the various features and advantageous details thereof are explained more fully with reference to the embodiments that are illustrated in the accompanying drawings and detailed in the following description of preferred embodiments. Descriptions of well-known components and processing techniques are omitted so as not to unnecessarily obscure the invention in detail.

Definitions

Figure 3:
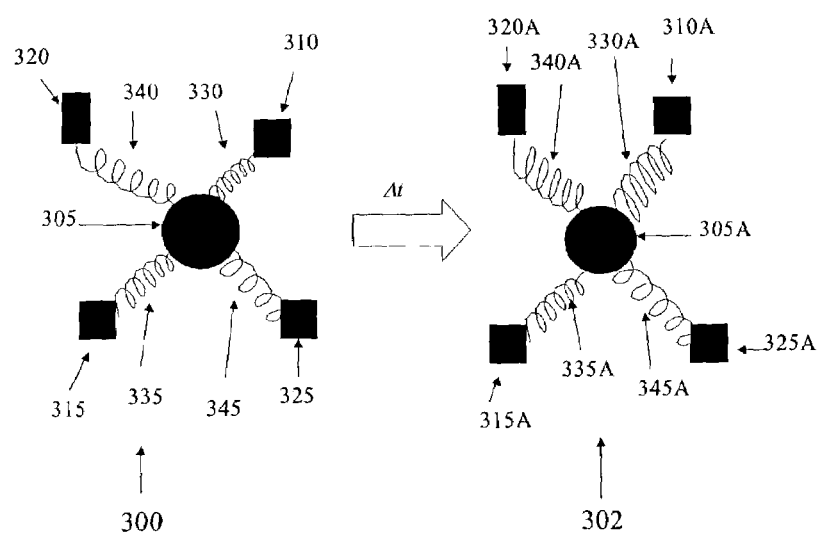
FIG. 3 illustrates a typical view of a simple landmark set (SLS) and its configuration change over time representing an embodiment of the invention.

1) Complex Landmark Set (CLS)—any Landmark Set that is not covered by the definition provided herein for a Simple Landmark Set (SLS).
2) Context Similarity (CS)—A metric that describes the distance between two sets of pixels by means of their context. As an example, an image and its duplicate have 0 (zero) distance, or the highest context similarity; while an image and its blurred copy have a distance greater than 0 (zero), e.g., the intensity difference for the same pixels in a reference image and a target image, and/or derived indexes associated with groups of pixels.
3) Feature—A function associated with an image, either intensity or RF, that is characterized by a value.
4) Feature Image—A two-dimensional or three-dimensional image that is derived from an intensity image, e.g., B-mode, or based on RF data.
5) Feature Index Value—a measure of an image parameter, e.g., gradient of image intensity, or texture.
6) Hard Landmark (HLM)—A landmark whose center coincides with the center of a region of interest, typically placed by an operator.
7) Landmark (LM)—A set of pixels in an image. Note that any region of interest can be considered a landmark. Note that any region of interest can be considered a landmark, including two-dimensional and three-dimensional regions of interest.
8) Landmark Set (LS)—A set of landmarks comprising a hard landmark and soft landmarks.
9) Minimum Search—Searching the minimum value of the cost metric function, e.g. searching the target image for landmarks to assess the motion vectors, where the motion vectors are determined based on the displacement of the landmarks in the target image compared to the landmark locations in the reference image.
10) Reference Image—An image used to define an initial context and dimensions of a region of interest.
11) Search Space—a geometry in the target image that is adapted to contain all possible locations of a particular landmark defined in the reference image.
12) Search Region—A region in the target image that is adapted to contain all the possible locations of a landmark set defined in the reference image.
13) Simple Landmark Set (SLS)—As shown in FIG. 3, an SLS has a central HLM and four neighboring SLMs. The four neighbors are connected to the HLM.
14) Soft landmark (SLM)—A landmark generated automatically by an algorithm as described herein.
15) Spatial Relationship of a Landmark Set—The dimensional connections between landmarks in an LS. Spatial relationship is otherwise referred to herein as geometric relationship or geometry relationship.
16) Spatial Relationship Similarity—A metric to describe the distance between two sets of LS's by means of their geometric configuration. As an example, an LS and its duplicate have 0 (zero) distance, or highest spatial relationship similarity; an LS and its modified version have a non-zero distance, where the modified version includes any landmark in the LS that moves away from its original spatial location.
17) Target Image—An image used to search the context and dimension of a region of interest defined in a reference image.
18) Template Matching—standard or modified similarity metric computation.

System for Motion Tracking

Figure 1:
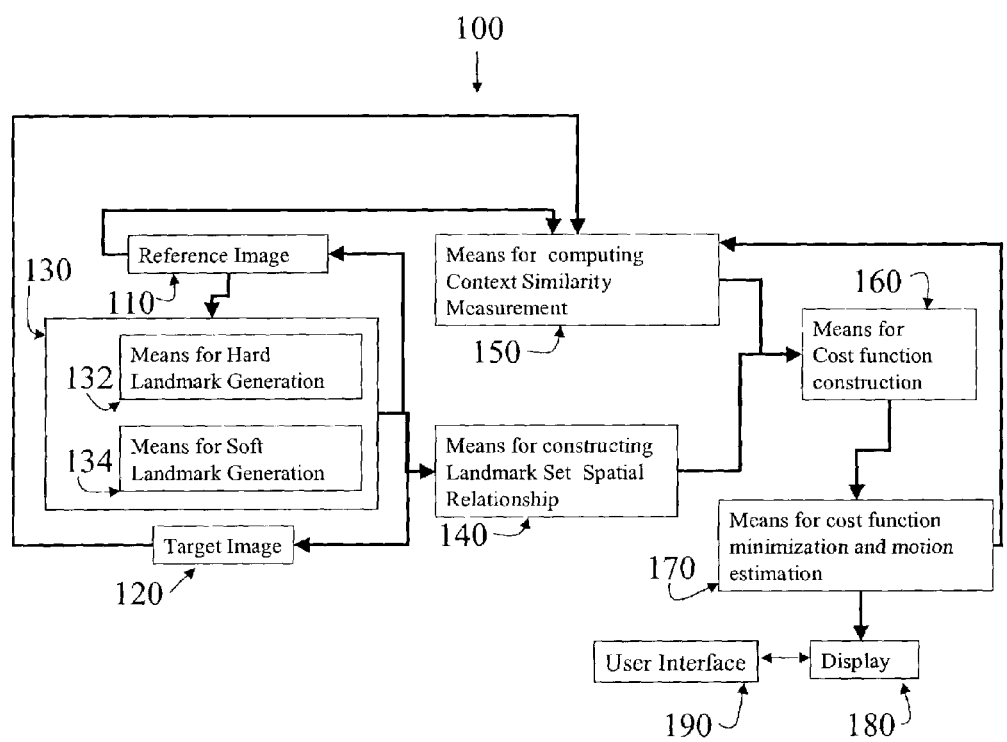
FIG. 1 illustrates a view of the major components of a system representing an embodiment of the invention.

Some embodiments of the invention according to a first aspect of the invention as shown in FIG. 1, provide a system for motion tracking 100. The system for motion tracking 100 includes a display 180 for providing images and a user interface 190. The images include an indication of a location of a hard landmark of an image. In some embodiments, the image is shown on display 180.

The system for motion tracking 100 further comprises processing resources and a memory. The processing resources are adapted to create a landmark set, and to track motion using a cost function. The cost function utilizes at least two variables for each of at least two landmarks. The two landmarks are elements of the landmark set. The memory is adapted to store data for use by the processing resources.

In some embodiments, the processing resources adapted to track motion are further adapted to: create a plurality of soft landmarks associated with the hard landmark, generate search regions for resolving at least two of the soft landmarks, present data corresponding to a new image, and create a new geometry relationship for the hard landmark in the new image. The processing resources can include a search module adapted to minimize a cost function for the soft landmarks; and a template-matching module adapted to track the hard landmark in the new image.

For some embodiments, the search module comprises means for cost function construction 160 and cost function minimization and motion estimation 170. The template-matching module comprises means for computing context similarity measurements 150. The memory can be adapted to store data for delayed use by the search module.

In the embodiment shown in FIG. 1, the processing resources include software and at least one computing processor. The software is disposed in at least one module and is adapted to interact with the computing processor so that each of means for generating a landmark set 130, means for constructing a landmark set spatial relationship 140, means for computing a context similarity measurement 150, means for cost function construction 160, means for cost function minimization and motion estimation 170 comprise a portion of at least one software module and a portion of at least one computing processor. The means for generating a landmark set 130 includes means for generating a hard landmark 132 and means for generating at least one soft landmark 134.

One aspect of the invention is implemented in embodiments that are based on establishing a collection of regions of interest (ROIs) to be tracked. A region of interest (ROI) can be any arbitrary collection of pixels in an image containing at least some pixels of particular interest. Usually an ROI will be a connected set of image pixels, most commonly a convex set such as a triangle or rectangle or oval. While regular polyhedra are often used, star shaped regions, hand drawn regions, and other connected, but not convex, sets of pixels including hand drawn regions can be ROIs.

Because ROIs can be essentially any shape or size, we recognize them as primarily a position marker for a particular position, shape or feature in the image. For this reason, in this application, we will call a region of interest a landmark and generally consider two types of landmarks. A hard landmark (HLM) is any ROI that is interesting of, and by, itself. A soft landmark (SLM) is an ROI that is primarily interesting because of its relationship with an HLM. Hard landmarks (HLMs) can be regions input interactively by an operator, detected by the system, or selected in any manner determined interesting by the system. For some embodiments of the invention, the collection of ROIs comprises a landmark set.

Soft landmarks are related to the hard landmark in a known manner and have at least one associated parameter, where one or more of the associated parameter(s) can also potentially be tracked. For example, in ultrasound imaging, soft landmarks can be specular regions surrounding the hard landmark, or the SLMs can be identifiable structure geometrically disposed with respect to the hard landmark. Note that the HLM can also be disposed at the centroid of the soft landmarks if no external input is asserted. Both the hard landmark and the soft landmarks can be tracked by basic speckle tracking or other means, allowing tracking of a hard landmark where the hard landmark and/or some of the soft landmarks are reasonably likely to dramatically change their image characteristics. One application of this invention can be to track isolated targets embedded in an image. Examples include the cross sectional view of a vessel, small tumor, and other anatomical features of interest.

Another aspect of the invention is implemented in embodiments that are based on a complex landmark set, (CLS). The CLS is composed of either only soft landmarks, or the combination of soft landmarks and a hard landmark. The links between the soft landmarks are automatically generated based on their geometrical position, resulting in an arbitrary region shape to best represent the specular region in the image and provide the most reliable motion information of this region. In one embodiment, the invented technology can be used to track a complex structured target embedded in the image. Examples include a skewed or longitudinal view of the vessel, large tumor, and other anatomical features of interest. In another embodiment, targets can be tracked while the contrast agent concentration in the many organs varies over time.

Methods for Motion Tracking

Figure 7:
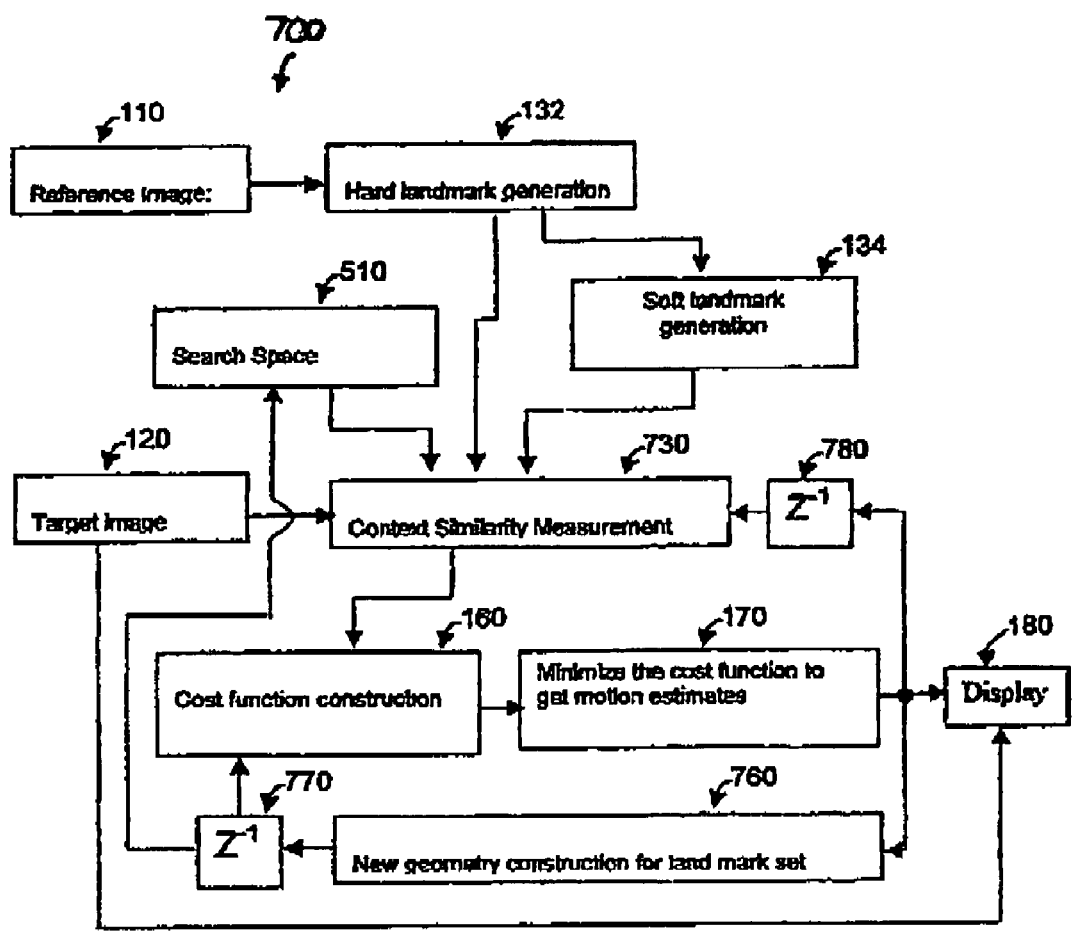
FIG. 7 illustrates a typical view of the general motion tracking algorithm flow chart for a sequence images, representing an embodiment of the invention.

According to a second aspect of the invention as shown in FIG. 7, some embodiments provide a method for tracking motion 700 in a medical imaging system. The method for tracking motion 700 comprises creating a collection of at least one landmark, and tracking motion using a cost function. The cost function includes two or more variables and has defined values over members of the collection. The cost function is subject to at least two constraints.

In some embodiments, creating a collection of at least one landmark comprises identifying at least one hard landmark 132, and selecting soft landmarks 134 corresponding to one or more of the at least one hard landmark. Selecting of the soft landmarks 134 can be performed automatically. In some embodiments, the collection of at least one landmark comprises a landmark set as described in the Generation of a Landmark Set section herein.

In some embodiments, the method of tracking motion 700 includes constructing a feature image, sorting features disposed in the feature image from a highest feature index value to a lower feature index value, and combining a spatial relationship and the feature index values to form the at least one soft landmark. The method of motion tracking 700 becomes more time and resource efficient when the method of motion tracking is only applied to features having a feature index value above a certain minimum threshold.

The soft landmark typically comprises a set of pixels. In some embodiments, the number of pixels comprising a soft landmark is typically in a range of approximately 1 to 49. For systems with greater computation power, the number of pixels in a landmark could increase as needed to perform robust motion tracking.

In some embodiments, the tracking motion step comprises minimizing the cost function 170. Variables of the cost function can include at least one of: a weighted feature image similarity measurement of soft landmarks in two or more images, and a spatial relationship similarity measurement of the soft landmarks in at least two of the two or more images. The weighted feature image similarity measurement can be calculated as value $\alpha$ as indicated in the Method of Motion Tracking for a CLS section herein. The spatial relationship similarity measurement can be calculated based on the spring constant, $\kappa$. In one embodiment, the spatial relationship similarity measurement is provided by the second term of equation 3 as shown in the Method of Motion Tracking for a Complex Landmark Set section below.

In some embodiments, cost function construction 160 is a step in a process as shown in FIG. 7. These embodiments can provide a method for tracking motion using a simple landmark set (SLS), shown in FIG. 3 as reference numbers 300 (reference SLS) and 302 (target SLS), or a complex landmark set (CLS), shown in FIG. 4 as reference no. 400. According to the embodiment described by FIG. 7, reference image 110 is used to define an initial context and dimensions of the region interest, where said defining results in hard landmark generation 132 and soft landmark generation 134.

Creating a collection of at least one landmark (or in certain embodiments a landmark set) can comprise hard landmark generation 132, and soft landmark generation 134. In some embodiments, the creating landmark set step 130 is performed automatically as described in the section covering Soft Landmark Generation.

Some embodiments create a landmark set 130 by linking various tracks on a target via some a priori knowledge, e.g., proximity or topological neighborhoods, and carrying the tracking information forward for parameters based on the most reliable tracks. For these embodiments, the method of motion tracking is based on one or more of the parameters. The a priori knowledge can be rules incorporated by experts, or knowledge extracted from the image itself. These embodiments provide a method to automatically extract data corresponding to important structure from the images and use said data for motion tracking. Both hard landmark generation 132 and soft landmark generation 134 can be accomplished through input from a user or by use of a priori knowledge. The landmarks can be generated solely based on the reference image 110 as indicated by FIG. 7.

Figure 2:
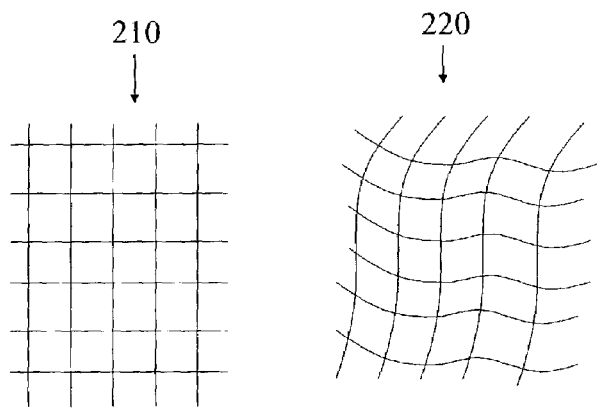
FIG. 2 illustrates a view of a conventional deformable mesh, appropriately labeled "PRIOR ART".

In some embodiments of the invention, prior knowledge, e.g. soft landmark data, is automatically extracted from the images; and a measure of the robustness of the soft landmarks is used in the motion tracking. These embodiments enable robust reacquisition of targets compared to prior art α-β trackers that pick a peak over a spatial extend and track it over time. For example, prior art deformable mesh tracking methods as shown in FIG. 2, attempt to map every point over a spatial extend depicted in a first frame to its corresponding point in a sequential frame. A deformable mesh usually starts as a regularly spaced grid covering the whole of a region, such as the reference mesh 210 as shown in FIG. 2.

The means for soft landmark generation 134 only picks a few choice points. On the other hand, the deformable mesh minimizes a cost function over the entire mesh (all points weighted equally) as the mesh transforms to a target mesh 220. The means for soft landmark generation 134 can disregard the location of a landmark that is not sufficiently correlated. Furthermore, the means for soft landmark generation 134 need not use the hard landmark (i.e., the object being tracked) at all, but instead can track the hard landmark using only the hard landmark's relative position to the soft landmarks.

In some embodiments, the creating landmark set step 130 includes generating a hard landmark 132, and generating a plurality of soft landmarks 134 proximal to the hard landmark as discussed in the section covering Generation of a Landmark Set. In some embodiments, a user input can provide the initial generation of the hard landmark 132. Alternatively, automatic identification can provide the hard landmark 305. In some embodiments, user or automatic selection of the soft landmarks can provide the initial generation of soft landmarks 134.

A target image 120 is used to search the context and dimension of a region of interest defined in a reference image 110. Typically, target image 120 represents and provides data corresponding to the same region of interest as the reference image 110, where the target image represents the region of interest at a later time than the reference image. For some embodiments of the invention the region of interest moves for one or more successive target images 120. Search space 510 can be updated from new geometry construction 760 directly, or preferably via new cost function construction delay 770.

Target image 120 can represent an image that occurs sequentially after reference image 110. In some embodiments, successive target images 120 can represent images occurring periodically in reference to a physiological cycle such as systole or diastole in a cardiac cycle. Successive target images 120 can correspond to an R-wave or other trigger event events to control acquisition timing throughout each cycle. The trigger events can include physiological triggers, manually initiated triggers, triggers automatically initiated by system signals, or triggers initiated by hardware outside of the medical imaging device. Similarly, successive target images 120 can correspond to time offsets of an appropriate trigger. Note also that the triggers can correspond to target images 120 that succeed one another indirectly, e.g., where an integral multiple of target images are provided between the trigger time offset, and where an integral multiple of the time offset corresponds to successive target images.

In some embodiments, the imaging system generates a search space 510 for resolving at least two of the soft landmarks. The data corresponding to the initial hard landmark generation 132 and soft landmark generation 134 can be inputted along with search space 510 and data corresponding to the target image 120 to create a context similarity measurement 730. The search space 510 comprises a geometry in target image 120 where said geometry is adapted to contain substantially all possible locations of a particular landmark defined in reference image 110. Context similarity measurement 730 can describe the distance between two sets of pixels by means of the context of said pixels. Context similarity measurement 730 can utilize the landmarks, search space 510 and image data to create a goodness of fit measure for every relevant landmark (also referred to herein as element) of the search space.

Upon obtaining context similarity measurement 730 for a sufficient number of candidate soft landmarks (e.g., reference numbers 310, 315, 320, and 325 in FIG. 3) in the search space 510, cost function construction 160 can be performed as discussed below in the Cost Function Construction and Minimization section herein. The Cost Function Construction and Minimization section also describes some embodiments of the cost function minimization step 170. Cost function minimizing step 170 can include combining goodness of fit measurements with the likelihood of the associated geometry.

Note that future general references to soft landmarks (SLM) herein will frequently include reference number 310 as an example thereof. Such general references should not be interpreted to include the specific position or other characteristics of SLS reference first neighbor soft landmark 310 as depicted in FIG. 3. Unless included in a list including other soft landmarks, when those specific characteristics are to be included the name "SLS reference first neighbor soft landmark" 310 will typically be used. Similar general usages of HLM 305 and connective element 330 and other reference numbers; including but not limited to cost function 160, motion vectors 620, context similarity measurement 500, and search space 510; are also used herein.

Data generated by cost function minimization 170 can be provided as output to display 180, as input for the context similarity measurement 730 for the next target image 120 through new context similarity data delay 780, and for constructing a new geometry 760 for the CLS 400 or target SLS 302. Data provided to context similarity measurement 730 for the next target image 120 can include soft landmarks 310 associated with the minimum cost function that are expanded in the new geometry construction step 760 to a new search space 610. New geometry 760 can be combined, after new cost function data delay 770, with context similarity measurement 730 for the next target image 120 to construct cost function 160 for the next target image. Also, the position of the hard landmark can be output for display 180.

In some embodiments, the region of interest includes at least one simple landmark set 300. The cost function comprises at least two variables for each of at least two landmarks in a first search space 510 and the SLS target first neighbor soft landmark 310A in a second search space.

In some embodiments, the tracking motion step further comprises minimizing the cost function 170, where variables of the cost function include at least one of a context similarity measurement 730 of soft landmarks 310 in two or more images; and a spatial relationship similarity measurement of the soft landmarks 310 in at least two of the two or more images.

Soft Landmark (SLM) Generation

A soft landmark 310 can be defined as a set (e.g., cluster) of pixels that include a prominent, and relatively stable feature over time. Examples of such soft landmarks are: the boundaries between different types of objects, corners, and extremely bright or dark regions; for instance, the boundaries between different tissues in medical imaging, and strong echo reflection regions in ultrasound images.

An algorithm provided by one embodiment of the invention automatically recognizes and identifies these soft landmarks. The algorithm comprises the following steps.
1) Constructing a feature image within a reference image 110;
2) Sorting the feature image from the highest to a lower feature index values, e.g., intensity gradient; or texture.
3) Forming a soft landmark composed of pixels, where the pixels are chosen based on their high feature index values and their preferred spatial relationships.

For the reference simple landmark set (SLS) 300 embodiment depicted in FIG. 3, the SLS reference first neighbor soft landmark 310 can comprise a set of pixels representing a visually identifiable sub-region having the highest feature index value in the reference image 110. Subsequently selected soft landmarks, such as SLS reference second neighbor soft landmark 315, SLS reference third neighbor soft landmark 320, and SLS reference fourth neighbor soft landmark 325 can comprise sets of pixels representing visually identifiable sub-regions having the next highest feature index values. In the illustrations of two different embodiments provided by FIG. 3 and FIG. 4, the soft landmarks 310 are rectangle shapes. However, as discussed earlier a soft landmark 310 can be almost any shape.

The construction of the feature image replaces a pixel value from the original reference image 110, or preceding target image 120, with a feature derived from this pixel and its neighbors. Note that a previous target image 120 becomes the reference image 110 for the subsequent target image as the motion is tracked.

The feature can be a wide variety of combination of operations, including the following: the first or second derivatives, the moments, or the co-occurrence matrices of the feature index values. In one embodiment, the first derivative of the feature index value is used. Using the first derivative enables the method to operate quickly compared to moments, or the co-occurrence matrices and provide a more stable result than the second derivative.

Note that in the context of some embodiments of the invention, texture is considered as a visual feature, is ideally spatially homogeneous, and typically contains repeated structures—often with some random variation (e.g., random positions, orientations or colors). Texture in an ultrasound image frequently contains information corresponding to the physical and chemical composition of the tissue. Use of texture in these embodiments is intended to correspond to methods for building repeated patterns that grow. In other embodiments of the invention texture can correspond to parameterization of various order statistics, feature extraction, and similar quantities known to those practiced in the art as such parameterization relates to image features such as speckle.

Hard Landmark (HLM) Generation

HLMs 305 are typically placed interactively by operators. In medical imaging systems, HLM 305 can be placed by positioning a cursor on a point by means of a trackball and then selecting the placement location. For HLMs 305 comprising larger square regions, the first selection can mark one corner of the square; the trackball can then be moved to the opposite corner. If an irregular HLM 305 shape is to be selected, the system can be configured so that the first select starts a trace that follows the position of the trackball, until a second select ends the trace.

Generation of Landmark Set

A landmark set can comprise either only soft landmarks 310, or a combination of an HLM 305 and a number of soft landmarks. Connective elements 330 such as a collection of weights are placed between the HLM 305 and each SLM 310. The connective elements 330 can alternatively be modeled as springs connecting HLM 305 with each SLM 310. In some embodiments, such as the complex landmark set (CLS) 400 illustrated in FIG. 4, the springs 330 can also connect selected SLMs 310 to one another such that the position of the HLM 305 can be estimated by the position of the SLMs and the springs 330.

Figure 4:
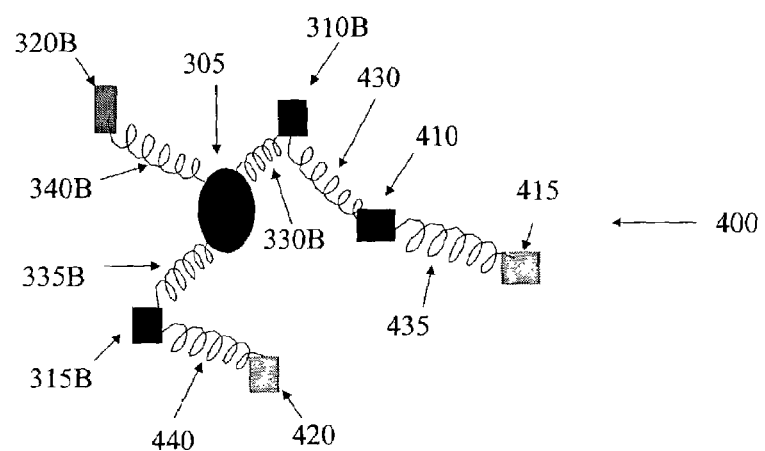
FIG. 4 illustrates typical views of a complex landmark set (CLS), its configuration connection, and geometrical relationship G, representing an embodiment of the invention.

The combination of the hard landmark 305 and the soft landmarks 310, 315, 320 and 325 can provide an arbitrary shape of region of interest. This combination is used to obtain a representation of the image information tailored to achieve reliable motion tracking. There are varieties of combinations of the hard landmark 305 and the soft landmarks 310. We now describe other important features of two combinations of landmarks. These combinations of landmarks are referred to herein as a simple landmark set (SLS) 300 as shown in FIG. 3, and a complex landmark set (CLS) 400 as shown in FIG. 4. Many other combinations of hard landmarks, soft landmarks and connective elements are possible according to the invention as will be understood by those skilled in the art.

1. Simple Landmark Set (SLS)

FIG. 3 shows the simple landmark set; two configurations are demonstrated. The left configuration changes to the right configuration over a period of time $\Delta t$. In each configuration, the solid circles represent the hard landmarks 305, 305A, the solid rectangles represent the soft landmarks 310, 310A, 315, 315A, 320, 320A, 325, and 325A; the coils 330, 330A, 335, 335A, 340, 340A represent the spring connections between the hard landmark 305 and the neighboring soft landmarks 310. A constant, k, can be used to represent the spring's coefficient. As shown in FIG. 3, the change of the spring's position e.g., between the left configuration reference SLS 300 and the right configuration target SLS 302, asserts a nonzero energy to the elements connected at both ends of the spring, and will contribute to the motion tracking. The configurations provided in FIG. 3 are called a simple landmark set (SLS). While the number of SLMs 310 depicted in FIG. 3 is four (4), the number of SLMs in an SLS 300 can vary widely, and are typically in a range from approximately 2 to 8. For tracking in a three-dimensional image the number of SLMs in an SLS 300 can vary widely, and are typically in a range from approximately 3 to 32.

The reference SLS 300 depicted in FIG. 3 includes an SLS reference first connective element 330, an SLS reference second connective element 335, an SLS reference third connective element 340, and an SLS reference fourth connective element 345. SLS first connective element 330 connects reference HLM 305 to SLS reference first neighbor soft landmark 310. SLS reference second connective element 335 connects HLM 305 to SLS reference second neighbor soft landmark 315. SLS reference third connective element 340 connects reference HLM 305 to SLS reference third neighbor soft landmark 320. SLS reference fourth connective element 345 connects reference HLM 305 to SIRS reference fourth neighbor soft landmark 325.

Target SLS 302 depicted in FIG. 3 includes an SLS target first connective element 330A, an SLS target second connective element 335A, an SLS target third connective element 340A and an SLS target fourth connective element 345A. SLS target first connective element 330A connects target HLM 305A to SLS target first neighbor soft landmark 310A. SLS target second connective element 335A connects target HLM 305A to SLS target second neighbor soft landmark 315A. SLS target third connective element 340A connects target HLM 305A to SLS target third neighbor soft landmark 320A. SLS target fourth connective element 345A connects target HLM 305A to SLS target reference fourth neighbor soft landmark 325A.

As shown in FIG. 3, the generation of SLS 300 comprises the following steps:

1) Placing a hard landmark 305 in a reference image 110,
2) generating at least one soft landmark 310 in a reference image,
3) identifying hard landmark 305 as the source of simple landmark set 300 by considering the geometry relationship between the hard landmark 305 and the neighboring soft landmarks 310, 315, 320 and 325 and the feature index values. In some embodiments, the identifying step occurs in an appropriate software module, associated with the means for constructing landmark set spatial relationship 140. The identifying step typically provides data used as an input for cost function construction.

For some embodiments, no overlap is allowed in the construction of SLS 300 for any of the landmarks. In one embodiment, overlap can be eliminated by replacing an SLM 310 if the spatial distance between the HLM 305 and the SLM is less than a threshold value. This threshold value can be determined in many ways. In one embodiment, the threshold value is determined by the size of the hard landmark 305. In some embodiments, the threshold value is approximately 1% to 35% of the hard landmark 305 size, preferably around 10%. Some embodiments can include overlapped elements. For example, a single landmark can be split into two overlapping elements.

In other embodiments, the threshold can be preset based on image modality and/or exam type, or can be computed from ROI size and estimates of image motion. In one embodiment, when imaging contrast agent flowing into a small vein or artery concomitant with respiration or heart-beating creates motion no larger than twice the vessel's width, the threshold can be on the order of four times the vessel's width.

In one embodiment, four neighboring soft landmarks 310 can be selected from the image region surrounding the hard landmark 305. For example, each of the neighboring soft landmarks 310 can be from a different one of the quadrant regions around the hard landmark 305. In a preferred embodiment, each of the neighbor soft landmarks 310 can have a high feature index and can meet a geometric constraint.

If the soft landmarks 310 are placed too close to the hard landmark 305, tissue motion can move the hard landmark within the search region used to estimate the new location of the soft landmark. If the hard landmark 305 moves within the search region used to estimate the new SLM 310A location, and if contrast agent is filling the HLM, the changed image intensity due to the flow of contrast agent can corrupt the estimate of the goodness of fit of the estimated new location of the soft landmark (SLM), as well as corrupt the new HLM location estimate. In other words, an inaccurate SLS target first neighbor SLM 310A location estimate with incorrect high confidence in its correctness can adversely affect the estimate of the new location of target hard landmark 305A.

2. Complex Landmark Set (CLS)

A simple landmark set 300 is often generated in the image region where the cross section of a vessel is imaged. The advantage of SLS 300 is that the computation effort is small, but the SLS still provides robust tracking when the deformation of the vessel occurs due to out of plane motion.

For some complex regions of interest, SLS 300 does not provide sufficiently robust tracking. For such complex regions of interest, more soft landmarks are needed to support the robustness of the motion tracking. As shown in FIG. 4, complex landmark set (CLS) 400 according to some embodiments of the invention can comprise hard landmark 305 and more than one soft landmark; e.g., 310B, 315B, 320B, 410, 415, and 420. In other embodiments not depicted herewith, CLS 400 comprises only soft landmarks 310. Complex landmark set 400 depicted by FIG. 4 illustrates one option for connecting the landmarks. The solid circle is the hard landmark 305, and the solid rectangles are the soft landmarks 310, 315B, 320B, 410, 415, and 420. Coils represent the spring connections 330B, 340B, 430, 435, and 440 between landmarks. While the number of SLMs 310 depicted in FIG. 4 is six (6), the number of SLMs in a CLS 400 can vary widely, and are typically in a range from approximately 3 to 20. For tracking in a three-dimensional image the number of SLMs in an CLS 400 can vary widely, and are typically in a range from approximately 4 to 50. Larger numbers of SLMs can be used for larger images and as computational capabilities increase.

Construction of the CLS 400 includes the following steps:

1). Using hard landmark 305 as the starting point, placing the hard landmark into a queue; e.g. a stack in memory;
2). Finding CLS first neighbor soft landmark 310B (i.e., closest in terms of proximity to hard landmark 305), connecting the CLS first neighbor soft landmark to the hard landmark, and placing the CLS first neighbor soft landmark into the queue;
3). Finding the CLS second neighbor soft landmark 315B, connecting the CLS second neighbor soft landmark to the closest landmark in the queue, e.g., either hard landmark 305 or CLS first neighbor soft landmark 310B;
4). Repeat step 3 until no significant soft landmark is found in a close region (e.g., a region of interest) or until the number of soft landmarks in the queue reaches a predefined number. For some embodiments, SLM "significance" in this context means having a feature index value above a predetermined threshold value. More generally, "significance" is determined for a search region section based on whether an SLM has "sufficient" statistical characteristics; i.e., sufficient to provide robust tracking for the particular application. In one embodiment, the close region means the smallest distance between the new soft landmark candidate and the closest landmark thereto in the queue has a value within 2 times of the size of the candidate landmark, and the predefined number of SLMs is 9.

For some embodiments as shown in FIG. 1, the hard landmark memory stack can be disposed in the means for hard landmark generation 132. The soft landmark memory stack can be disposed in the same memory as the hard landmark memory stack where the multi-purpose memory is adapted to provide and accept data to both means for hard landmark generation 132 and means for soft landmark generation 134. Such a multi-purpose memory can also provide and accept other data corresponding to reference image 110 and target image 120. The memory can be embedded in at least one computing processor.

CLS 400 as shown in FIG. 4, includes CLS first neighbor soft landmark 310B, CLS second neighbor soft landmark 315B, CLS third neighbor soft landmark 320B, first once-separated neighbor soft landmark 410, first twice-separated neighbor soft landmark 415, second once-separated neighbor soft landmark 420, CLS first connective element 330B, CLS second connective element 335B, CLS third connective element 340B, CLS fourth connective element 430, CLS fifth connective element 435, and CLS sixth connective element 440.

CLS first connective element 330B connects HLM 305 to CLS first neighbor soft landmark 310B. CLS second connective element 335B connects target HLM 305 to CLS second neighbor soft landmark 315B. CLS third connective element 340B connects HLM 305 to CLS third neighbor soft landmark 320B. CLS fourth connective element 430 connects CLS first neighbor soft landmark 310B to first once-separated neighbor soft landmark 410. CLS fifth connective element 435 connects first once-separated neighbor soft landmark 410 to first twice-separated neighbor soft landmark 415. CLS sixth connective element 440 connects CLS second neighbor soft landmark 315B to second once-separated neighbor soft landmark 420. Many other arrangements of HLMs 305, SLMs 310 and connective elements 330 can be implemented to track motion and to describe a region of interest according to some embodiments of the invention.

Properties of a Landmark Set and Use thereof for Motion Tracking

For some embodiments of the invention, certain properties of the landmark set enable the motion tracking algorithm described later in this application to operate effectively and provide sufficient robustness for ultrasound imaging. One such property of the landmark set is the landmark set's stability in terms of both context similarity (CS) metrics and spatial relationship (referred to as the Geometry "G" below). Stability in this circumstance means that in an image sequence, the CS and G of the landmark set does not change so much that the motion tracking fails, e.g., provides an incorrect tracking result. The stability of the landmark set is considered at this time instead of considering the stability of a single landmark because for a single landmark the stability is typically poor for many imaging applications. For some embodiments, the stability of the landmark set corresponds to an absolute measure of the cost function. In other embodiments, the stability of the landmark set corresponds to the value of the local peak of the cost function. For the SLS 300, stability corresponds to the confidence measure, e.g., 50% rule or $\frac{3}{5}$ rule, as explained in the Cost Function Construction and Minimization section herein.

Figure 5:
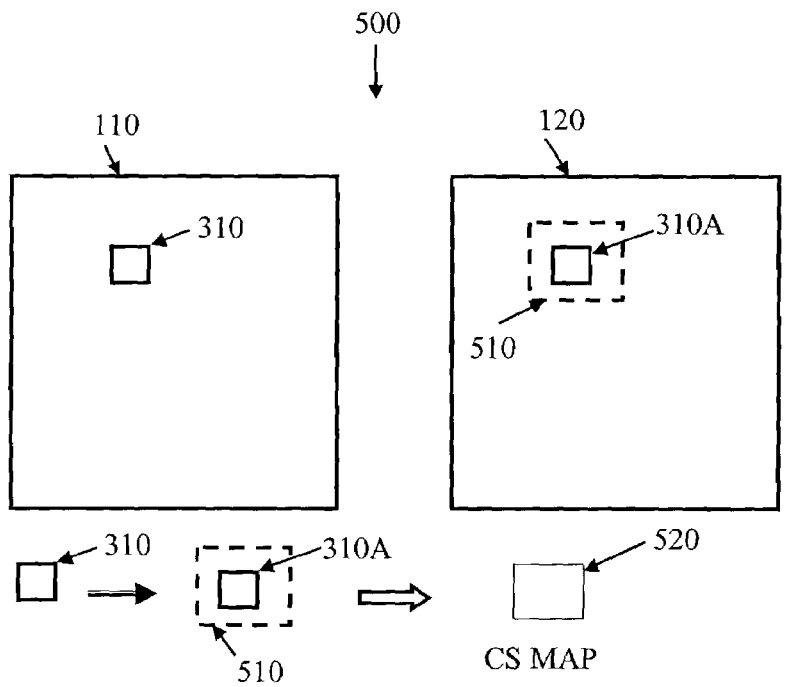
FIG. 5 illustrates the context similarity (CS) measurement, search region, and CS map, representing embodiment of the invention.

Context similarity (CS) measurement 500 is illustrated in FIG. 5. Given two images, a reference image 110, and a target image 120, the context similarity measurement 500 is used when comparing SLS reference first neighbor soft landmark 310 in the reference image to the same set of pixels in the target image, e.g., the best match SLS target first neighbor soft landmark 310A. The context similarity of two landmarks, such as SLS reference first neighbor soft landmark 310 and SLS target first neighbor soft landmark 310A can be measured in terms of an image intensity value, or a derived feature image as described above in the soft landmark generation section. The context similarity metrics of the landmark set provide a measure that is a sophisticated function of each landmark's similarity instead of simple summation between the reference image 110 and the target image 120. The geometric relationship of the landmarks in each landmark set is controlled by the kinetic energy determined by the springs connecting the landmarks. Therefore, the motion tracking of a region of interest determines a corresponding landmark set in the target image 120.

The context similarity measurement 500 can have various forms. In one embodiment, CS measurement 500 can be implemented using sum of absolute difference (SAD). The context similarity measurement 500 can be applied to a search region to obtain a matrix of CS values, called a CS map 520. By searching the best fit of candidate soft landmarks in CS map 520, a motion vector is found. Conventional methods compute the SAD value as a CS map 520 and look for the minimum SAD in the CS map to obtain the motion vector.

Alternative methods include correlation, sum of square differences (SSD), maximum likelihood, or any other metric measuring similarity between images.

Figure 6:
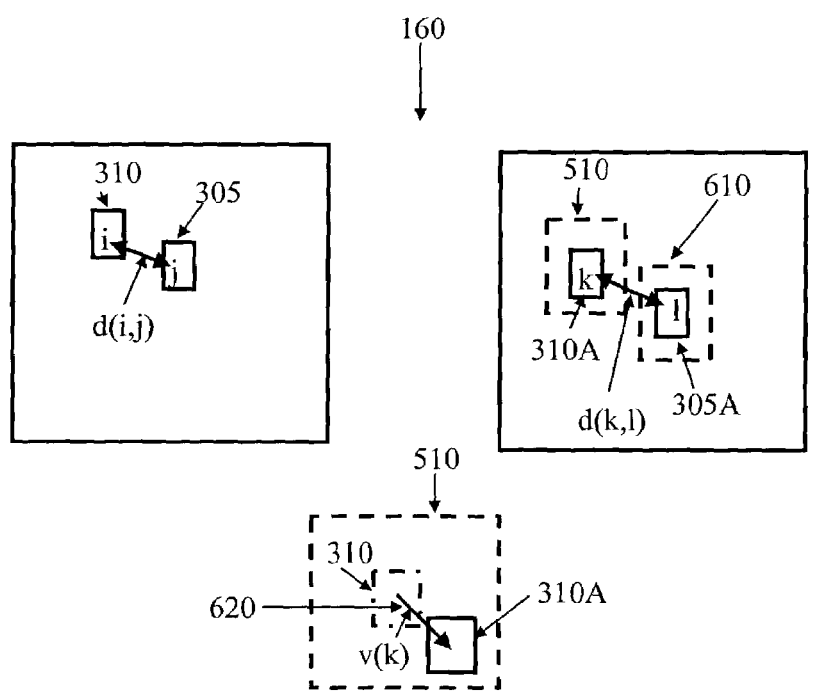
FIG. 6 illustrates the terms in the cost function construction, representing embodiment of the invention.

The geometric relationship of a landmark set is illustrated in FIG. 3 and FIG. 4. The springs connecting the landmarks provide an inertia to the spatial relationship, e.g., appropriately limit the change of the geometric relationship of the connected landmarks. The change of the spatial relationship is measured by the difference $(d(i,j)-d(k,l))$ of the distances between the connected landmarks in the reference image 110 and the target image 120 as illustrated in FIG. 6. The use of the spatial relationship will be illustrated in Cost Function Construction and Minimization section herein.

Cost Function Construction and Minimization

1) Method for Tracking a Simple Landmark Set (SLS)

For an SLS 300 as shown in FIG. 3, the context similarity measurement (CS) measurement 500 of the simple landmark set is defined as a nonlinear function. The motion algorithm for tracking an SLS is based on the assumption that if most (>or=50%) of the elements in the landmark set have high CS, then the landmark set will follow the motion of the these elements and ignore the motion of other elements with lower similarity. In one embodiment of the invention, cost function construction 160 is performed by using a $\frac{3}{5}$ rule. For this embodiment, the image intensity and/or derived feature of each element may vary from time to time, but less than $\frac{3}{5}$ of the elements change at the same time, e.g., from a preceding image to the next image. The $\frac{3}{5}$ rule is a confidence measure. Lower values of this confidence measure can be suitable for simple landmark sets 300 comprising more elements, or for simple landmark sets implemented for applications with less stringent performance requirements. In some embodiments, the confidence measure is in a range from approximately 0.3 to 1.00.

The spatial relationships between the elements are controlled by the kinetic energy of the springs connecting the elements. The position relationship between elements varies from time to time, but within certain limitations. The soft landmarks can change relative distance from each other and the HLM 305, but each landmark cannot move out of a limited range controlled by a corresponding spring coefficient κ.

In some embodiments, cost function construction 160 includes: computing sums of absolute differences (SAD) between the reference image 110 and the target image 120 in the search space for each landmark to obtain a CS map 520 of each landmark, and modifying context similarity map 520 of target hard landmark 305A using a confidence measure, such as the 50% rule.

According to some embodiments, context similarity map 520 for target HLM 305A can be modified according to a selected confidence measure, one example of which is provided in the equation (2) below as the 50% rule.

$$SAD'_{HLM}(i,j) = \frac{1}{2}\Bigg(SAD_{HLM}(i,j) + \begin{cases} E[SAD^m_{NSLM}(k,l)], & \text{if 50\% Rule applies} \\ p \cdot SAD_{HLM}(i,j), & \text{else} \end{cases}\Bigg) \quad (1)$$

Where E[ ] is the expectation operator, $SAD_{HLM}(i,j)$ is the sum of the absolute differences between the hard landmark 305 in the reference image 110 and the object in the search space centered at (i,j), p=1.0+ϵ, with ϵ being a small real number, and the 50% Rule is:

$$SAD_{HLM}(i,j) > p \cdot \left(SAD^m_{NSLM}(k,l) + \frac{1}{2} \cdot \kappa \cdot d(i,j,k,l)\right) \quad (2)$$

where κ is the spring constant, d(i,j,k,l) is the distance between the search objects located at (i,j) and (k,l), and $SAD^m_{NSLM}(k,l)$ is the sum of the absolute differences between the $m^{th}$ neighboring soft landmark and the search object at (k,l). In one embodiment, ϵ=0.15. The number (ϵ) can be understood as the tolerance of the motion tracking. The smaller the value of the motion tracking tolerance ϵ, the less stringent the restriction, the more tolerant is the motion tracking (easier to satisfy the 50% rule). The vector length of each spring is represented by d. From equation (2) [the 50% rule], we see that when ϵ=0, the 50% rule is valid when the sum of SAD of a neighboring software landmark and the geometry deformation penalty term, ½ κd(i,j,k,l), is less than the SAD of the hard landmark. When the motion tracking tolerance (ϵ) increases, a small SAD of a neighboring software landmark is required to make the 50% valid. So the motion tracking tolerance (ϵ) partially controls the mechanism for how we decide to accept to use the information from the neighboring soft landmark for the motion tracking. In some embodiments, the motion tracking tolerance g is in a range from approximately 0 to 1.0.

Subscript NSLM means the neighboring soft landmark 310, and subscript HLM means hard landmark 305. Superscript m is the index for the $m^{th}$ neighboring soft landmark. Variables i, j, k, l are the image pixel position indices. In the embodiment described by equations 1 and 2, the spring vector length, d(i, j, k, l) can be any metric measuring the distance between (i,j) and (k,l) or, when strict linear ordering is accounted for, even a pseudo-metric can be used. In one embodiment adapted for computational efficiency, d(i, j, k, l) is defined as the square of the distance, i.e. d(i, j, k, l)=(i−k)²+(j−l)².

The 50% rule implementation is an alternative to the ⅗ths rule when the hard landmark can be reasonably assumed to be partially correct. The 50% rule means that if 50% of the neighboring soft landmarks have a better context similarity (CS) than the hard landmark 305, the hard landmark 305A will modify its CS map 520 to conform to with the CS maps 520 of these soft landmarks. For instance, when contrast agent flows into the vessel and changes the image intensity in medical imaging, the CS map 520 computed for the HLM 305 may no longer be a reliable indicator for motion tracking. Instead the soft landmarks 310, which could be the vessel wall region or surrounding speckle, should be used to track the motion of the HLM 305.

2) Motion Vector Determination for a Simple Landmark Set

The motion vector for the HLM 305 is determined by finding the best fit in the modified CS map 520 of the hard landmark. In one embodiment, this best fit is the minimum SAD value in the modified CS map 520. In alternative embodiments, the best fit can correspond to a maximum correlation in the modified CS map. The motion vector 620 corresponding to SLS first neighbor soft landmarks 310 and 310A, as shown in FIG. 6, is disposed in SLS target first neighbor landmark search space 510.

3) Method of Motion Tracking For a Complex Landmark Set

Some embodiments of the invention provide a method for tracking motion in a medical imaging system. The method for tracking motion comprises creating a landmark set, and tracking motion using a cost function of two or more variables for each of at least two landmarks, where the cost function is subject to at least two constraints. One example of these embodiments is described below. For this example, the two constraints are:

(1) each vector ($v_i$) is disposed in a corresponding search region ($S_i$), and (2) landmark i and landmark j are disposed in geometry (G).

In this example referring to FIG. 6, we simply denote each landmark as a node, and for node indices i, j, let (i,j)∈G mean that nodes i (SLS reference first neighbor soft landmark 310) and j (hard landmark 305) are connected in the Geometry so that node i is connected to node j and both nodes are elements of G.

Let $d_{ij}$ be the distance from node i to node j, and in general let the weighted feature similarity measurement, $\alpha_i$, be defined as follows:

$$\alpha_i = \frac{\max_{v_i \in S_i}(cs_{v_i}) - \min_{v_i \in S_i}(cs_{v_i})}{mean_{v_i \in S_i}(cs_{v_i})},$$

where $S_i$ denotes the search region (510) for the i-th node (310A) in target image 120.

When a node, for instance node k (310A), moves inside the search space (510), the motion vector v is used to represent the displacement. For example, v(k) is the motion vector 620 from the initial position (dotted line) 310 to the new position (solid line) 310A.

Then we construct the cost function, C(U, G) 160, defined as the function of the motion vector U and landmark set geometry G, as, $$C(U, G) = \frac{\underset{U \in S_i}{\text{Max}}(SAD(U)) - \underset{U \in S_i}{\text{Min}}(SAD(U))}{\underset{U \in S_i}{E}[SAD(U)]} \times SAD(U) + \quad (3)$$

$$\sum_{i \neq U} \sum_{v_i \in S_i} \left\{ \frac{\underset{v_i \in S_i}{\text{Max}}(SAD(v_i)) - \underset{v_i \in S_i}{\text{Min}}(SAD(v_i))}{\underset{v_i \in S_i}{E}[SAD(v_i)]} \times SAD(v_i) + \right.$$

$$\left. \sum_{R(i,m) \in G} \frac{1}{2}\kappa(\Delta v(i,m))^2 \right\}$$

In this equation, $v_i$ is the motion vector of node i in the search region $S_i$. Δv(i, m) is the change of the distance between node m and node i in the target image 120. Referring to FIG. 6, Δv(k,l)=d(i,j)−d(k,l), represents the change of the spatial position of the two elements 305A and 310A in the target image 120 compared with the elements 305 and 310 in the reference image 110. R(i, m) means the relation of the i and m nodes. For some embodiments, Equation (3) can implement an adaptive weighting strategy using the term $$\frac{\underset{v_i \in S_i}{\text{Max}}(SAD(v_i)) - \underset{v_i \in S_i}{\text{Min}}(SAD(v_i))}{\underset{v_i \in S_i}{E}[SAD(v_i)]}$$

as the weighted feature similarity measurement. The weighted feature similarity measurement for these embodiments adaptively determines the contribution of the node i in determining the motion vector 620. In equation (3) above, motion vector U is the motion of the hard landmark 305 or its representative.

Motion Vector Determination for a Complex Landmark Set

The selected motion vector is found by minimizing the cost function C(U, G) over all possible motion vectors, U.

Methods and Systems for Describing a Region of Interest

According to a third aspect of the invention as can be described as a subset of FIG. 1, some embodiments provide a method of describing a region of interest (ROI) in a medical image. The method of describing the ROI comprises identifying a hard landmark, selecting a plurality of soft landmarks proximal to the hard landmark, and associating a cost function between at least two of the soft landmarks and the hard landmark.

With reference to FIG. 1, some embodiments of the identifying steps can comprise generating a hard landmark 132, and generating at least two soft landmarks 134 proximal to the hard landmark 305.

In some embodiments, associating a cost function includes constructing a landmark set spatial relationship 140 as described above in the Generation of Landmark Set section herein. Constructing the spatial relationship 140 can include peak identification in the ROI. Peak identification can provide data that accurately identifies a regional peak corresponding to hard landmark 305, and at least two local peaks proximal to the hard landmark that correspond to soft landmarks. Peak identification can include associating a cost function between at least two of the soft landmarks and the hard landmark 305.

In some embodiments, associating a cost function includes computing context similarity measurement 150 as described above in the Properties of a Landmark Set and use thereof in Motion Tracking section. Computing context similarity measurement 150 can include determining the type of interpolation or extrapolation technique to be applied to identified peaks, where said determination can be based on ROI characteristics such as texture and edge characteristics. This determining technique step can, for example, indicate that one or more of peak interpolation, parabolic, or hyperbolic techniques are to be used. The ROI description process then concludes with cost function construction 160. Cost function construction 160 can include using input from both the technique determining step and the peak identification step, and applying the selected technique(s).

In some embodiments, the method of describing an ROI includes tracking the ROI by means of minimizing the cost function. The cost function corresponds to at least one of a weighted feature image similarity measurement of soft landmarks in two or more images, and a spatial relationship similarity measurement of the soft landmarks in at least two of the two or more images.

Various additions, modifications and rearrangements of the features of the invention may be made without deviating from the spirit and scope of the underlying inventive concept. While the invention has been described above by reference to various embodiments, it should be understood that many changes and modifications can be made without departing from the scope of the invention. For example, some of the embodiments described above specifically address ultrasound imaging methods and systems. However, the methods and systems described herein can readily be implemented in other medical imaging modalities such as computed tomography (CT), magnetic resonance (MR), positron emission tomography (PET), and digital radiography. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. A method for tracking motion in a medical imaging system, comprising:
    creating a collection of landmarks, each landmark corresponding to a set of pixels representing an area or volume region with an at least two-dimensional outline; and
    tracking motion from a first image to a second image using a cost function of two or more variables, the cost function defined over members of the collection and including a geometric relationship between the members of the collection, the cost function subject to at least two constraints, the cost function being a function of a fit of each set of pixels for the area or volume region in the first image to a search space in the second image, the fit corresponding to a correlation, sum of absolute difference, sum of square difference, maximum likelihood, or metric measuring similarity between the set of pixels and the search space and corresponding to selecting as a function of different possible fits.

2. The method of claim 1 wherein the collection of landmarks comprises at least two landmarks.

3. The method of claim 1 wherein the collection of landmarks comprises at least two soft landmarks and at least one hard landmark.

4. The method of claim 3, wherein creating a collection of landmarks comprises:
    identifying at least one hard landmark; and
    selecting at least one soft landmark corresponding to one or more of the at least one hard landmark, the selecting of the soft landmarks performed automatically.

5. The method of claim 4, wherein selecting the soft landmarks comprises:
    constructing a feature image;
    sorting features disposed in the feature image from a highest feature index value to a lower feature index value; and
    forming at least one soft landmark composed of pixels, the pixels of the formed soft landmark chosen based on their high feature index values and their preferred spatial relationships.

6. The method of claim 4, wherein identifying the at least one hard landmark is performed by the imaging system.

7. The method of claim 6, wherein identifying the at least one hard landmark in the second image is based primarily on tracking of at least two soft landmarks.

8. The method of claim 3, wherein:
the tracking motion step comprises minimizing the cost function; and
variables of the cost function include at least one of:
the fit being a weighted feature image similarity measurement of soft landmarks in two or more images; and
a spatial relationship similarity measurement of the soft landmarks in at least two of the two or more images.

9. The method of claim 8, wherein the weighted feature image similarity measurement comprises a context similarity measurement.

10. The method of claim 3 further comprising generating the search space for resolving at least two of the at least two soft landmarks, the search space comprising a geometry in a target image comprising the second image, the geometry adapted to contain substantially all possible locations of at least one landmark defined in a reference image comprising the first image.

11. The method of claim 1 further comprising motion estimation.

12. The method of claim 11, wherein:
motion estimation includes determining at least one motion vector for a corresponding landmark; and
the cost function includes an adaptive weighting strategy to determine the relative contributions to a corresponding motion vector of at least two nodes.

13. The method of claim 1, wherein the cost function is minimized.

14. The method of claim 1 wherein the at least two dimensional outline comprises a three dimensional outline with the region being from three-dimensional data.

15. The method of claim 1, wherein the at least one landmark includes one of RF data or image intensity data.

16. The method of claim 1, wherein:
the at least one landmark disposed in a reference image comprising the first image and at least one successive target image comprising at least the second image; and
each successive target image temporally separated by approximately an integer multiple of a cardiac cycle from one of a preceding target image and the reference image.

17. The method of claim 1 wherein tracking motion comprises tracking motion through a plurality of successive images.

18. A method of describing a region of interest (ROI) in a medical image, the method comprising:
identifying a hard landmark in an image;
selecting a plurality of soft landmarks proximal to the hard landmark in the image;
associating a cost function between at least two of the soft landmarks and the hard landmark in the image, the cost function comprising a spring function; and
tracking the ROI by means of minimizing the cost function, the cost function corresponding to at least one of a weighted feature image similarity measurement of soft landmarks in two or more images, and a spatial relationship similarity measurement of the soft landmarks in at least two of the two or more images, the spatial relationship similarity measurement comprising the spring function.

19. The method of claim 18 further comprising selecting one of an interpolation and an extrapolation technique for tracking at least three soft landmarks corresponding to identified peaks.

20. The method of claim 19 further comprising applying the selected technique to at least three of the identified peaks.

21. A medical imaging system adapted to describe a region of interest (ROI) in a medical image, the system comprising:
means for identifying a hard landmark in an image;
means for selecting a plurality of soft landmarks proximal to the hard landmark in the image, the soft landmarks each corresponding to a set of pixels representing an area or volume region with an at least two-dimensional outline; and
means for associating a cost function between at least two of the soft landmarks and the hard landmark in the image, the cost function being a function of a geometric relationship between landmarks and a fit of the set of pixels for the area or volume region in the first image to a search space in the second image, the fit corresponding to selecting a location as a function of different possible fits.

22. A system for tracking motion in an imaging system comprising:
a display for providing images, the images including an indication of location of a hard landmark of an image, the hard landmark corresponding to a set of pixels representing an area or volume region with an at least two-dimensional outline;
processing resources adapted to create a landmark set;
processing resources adapted to track motion from a first image to a second image using a cost function of at least two variables for each of at least two landmarks, the at least two landmarks being elements of the landmark set, the cost function being a function of a geometric relationship between landmarks and a fit of the set of pixels for the area or volume region in the first image to a search space in the second image, the fit corresponding to selecting a location as a function of different possible fits; and
memory adapted to store data for use by the processing resources.

23. The system of claim 22 wherein:
the processing resources adapted to track motion are further adapted to:
create a plurality of soft landmarks associated with the hard landmark;
generate search regions, including the search space, for resolving at least two of the soft landmarks;
present data corresponding to a new image; and
create a new geometry relationship for the hard landmark in the new image; and
the processing resources include:
a search module adapted to minimize a cost function for the soft landmarks; and
a template matching module adapted to track the hard landmark in the new image; and
the memory is further adapted to store data for delayed use by the search module.

24. The system of claim 23, wherein:
the search module comprises:
means for cost function construction, and
means for cost function minimization and motion estimation; and the template matching module comprises means for computing context similarity measurements.

25. A system for tracking motion in an imaging system comprising:
   means for generating a landmark set;
   means for computing a context similarity measurement;
   means for constructing a spatial relationship for a landmark set;
   means for construction of a cost function, the cost function comprising a spring function or a weight function; and
   means for minimizing the cost function and estimating motion from a first image to a second image as a function of minimizing the cost function.

26. The system of claim 25, wherein the means for generating a landmark set, includes:
   identifying at least one hard landmark; and
   selecting at least one soft landmark corresponding to one or more of the at least one hard landmark.

27. The system of claim 25 further comprising:
   a display adapted to receive data from the means for minimizing the cost function and estimating motion; and
   user interface means adapted to provide input to the means for generating a landmark set.

28. A computer-readable medium carrying one or more sequences of instructions for tracking motion in a medical imaging system, wherein execution of the one or more sequences of instructions by one or more processors causes the one or more processors to perform the steps of:
   creating a collection of landmarks; and
   tracking motion from a first image to a second image using a cost function of two or more variables, the cost function defined over members of the collection, the cost function subject to at least two constraints, the cost function being a function of a geometric relationship between landmarks and a fit of texture associated with the landmarks in the first image to a search regions of the second image, the fit corresponding to a correlation, sum of absolute difference, sum of square difference, maximum likelihood, or metric measuring similarity between the set of pixels.

* * * * *